United States Patent
Hsu et al.

(10) Patent No.: US 9,749,822 B2
(45) Date of Patent: Aug. 29, 2017

(54) ELECTRONIC DEVICE AND ITS WIRELESS NETWORK CONNECTION METHOD

(71) Applicant: Acer Incorporated, New Taipei (TW)

(72) Inventors: Wen-Cheng Hsu, New Taipei (TW);
Hung-Chih Yu, New Taipei (TW);
Chi-Hung Chang, New Taipei (TW);
Shih-Hao Lin, New Taipei (TW);
Chia-Hsun Lee, New Taipei (TW);
Kai-Ping Chang, New Taipei (TW);
Cheng-Hsin Chang, New Taipei (TW);
Wen-Ping Chang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/663,842

(22) Filed: Mar. 20, 2015

(65) Prior Publication Data
US 2015/0312737 A1 Oct. 29, 2015

(30) Foreign Application Priority Data

Apr. 23, 2014 (TW) .............................. 103114629 A

(51) Int. Cl.
  *H04W 4/16* (2009.01)
  *G08C 17/02* (2006.01)
  *G08C 23/02* (2006.01)

(52) U.S. Cl.
  CPC .............. *H04W 4/16* (2013.01); *G08C 17/02* (2013.01); *G08C 23/02* (2013.01); *G08C 2201/20* (2013.01)

(58) Field of Classification Search
  CPC .......... H04W 4/16; G08C 17/02; G08C 23/02
  USPC .......................... 455/502, 41.2, 73, 41.3, 566
  See application file for complete search history.

(56) References Cited

U.S. PATENT DOCUMENTS

| | | | |
|---|---|---|---|
| 4,245,352 A | 1/1981 | Karpowycz et al. | |
| 9,159,066 B2* | 10/2015 | Roeding ................ | G06Q 30/00 |
| 2006/0046653 A1* | 3/2006 | Kirbas ................. | H04M 1/0235 |
| | | | 455/41.2 |
| 2009/0322488 A1 | 12/2009 | Kanagala et al. | |
| 2010/0278345 A1 | 11/2010 | Alsina et al. | |
| 2011/0263201 A1* | 10/2011 | Bukurak ................. | H04W 4/00 |
| | | | 455/41.2 |
| 2012/0169482 A1 | 7/2012 | Chen et al. | |
| 2012/0263020 A1 | 10/2012 | Taylor et al. | |

(Continued)

OTHER PUBLICATIONS

TW Office Action dated Feb. 1, 2016 in corresponding Taiwan application (No. 103114629).

(Continued)

*Primary Examiner* — Tuan Pham
(74) *Attorney, Agent, or Firm* — McClure, Qualey & Rodack, LLP

(57) ABSTRACT

A wireless network connection method for an electronic device is provided, in which a first signal is transmitted to additional electronic device and is utilized to identify the electronic device. When the additional electronic device identifies the electronic device through the first signal, it establishes wireless communication between the electronic device and the additional electronic device. A second signal is transmitted to the additional electronic device. The second signal is an audio signal to instruct the additional electronic device to maintain the wireless communication.

9 Claims, 6 Drawing Sheets

(56) References Cited

U.S. PATENT DOCUMENTS

| | | | |
|---|---|---|---|
| 2012/0317194 A1 | 12/2012 | Tian | |
| 2013/0162566 A1* | 6/2013 | Yajima | G09G 5/006 |
| | | | 345/173 |
| 2014/0086549 A1 | 3/2014 | Davidson et al. | |
| 2014/0206346 A1* | 7/2014 | Kiukkonen | H04W 52/0229 |
| | | | 455/426.1 |
| 2014/0253383 A1* | 9/2014 | Rowitch | G01S 1/02 |
| | | | 342/386 |
| 2015/0084736 A1* | 3/2015 | Horton | G07C 9/00007 |
| | | | 340/5.7 |

OTHER PUBLICATIONS

Search Report issued in TW Office Action dated Feb. 1, 2016 in corresponding Taiwan application (No. 103114629).
TW Office Action dated Oct. 26, 2016 in corresponding Taiwan application (No. 103114629).
Search Report issued in TW Office Action dated Oct. 26, 2016 in corresponding Taiwan application (No. 103114629).
TW Office Action dated Mar. 22, 2017 in corresponding Taiwan application (No. 103114629).
Search Report listed in TW Office Action dated Mar. 22, 2017 in corresponding Taiwan application (No. 103114629).

* cited by examiner

ELECTRONIC DEVICE AND ITS WIRELESS NETWORK CONNECTION METHOD

CROSS REFERENCE TO RELATED APPLICATIONS

This application claims priority of Taiwan Patent Application No. 103114629 filed on Apr. 23, 2014, the entirety of which is incorporated by reference herein.

BACKGROUND OF THE INVENTION

Field of the Invention

The invention relates to communications technology, especially to a wireless network connection method and its electronic device.

Description of the Related Art

Utilizing cables for connecting two electronic devices is a common method of establishing a communication link. However, compared to communication through a wired connection, wireless communication is more convenient. Existing technologies of wireless communication include far-distance technologies such as Wi-Fi, General Packet Radio Service (GPRS), and Code Division Multiple Access (CDMA), as well as near-distance technologies such as Wi-Fi Direct, Bluetooth and NFC.

Specific hardware is required to support the wireless communication technologies listed above, however. When the user wants to transmit or share data, he needs to input the settings for each different electronic device—a process that takes time and can be inconvenient. Therefore, a high-efficiency wireless communication method is needed for the electronic device to automatically detect the connection status and further initiate or stop a network connection service so that the user can more easily transmit and share data.

BRIEF SUMMARY OF THE INVENTION

The present invention provides a wireless network connection method for an electronic device. The wireless network connection method includes transmitting a first signal to an additional electronic device, and the first signal is utilized to identify the electronic device; when the additional electronic device identifies the electronic device through the first signal, developing wireless communication between the electronic device and the additional electronic device; and transmitting a second signal to the additional electronic device, and the second signal is an audio signal for instructing the additional electronic device to maintain the wireless communication.

The present invention provides a wireless network connection method for an electronic device. The wireless network connection method includes receiving a first signal from an additional electronic device, and the first signal is utilized to identify the additional electronic device; when the additional electronic device is identified through the first signal, developing a wireless communication between the electronic device and the additional electronic device; and receiving a second signal transmitted by the additional electronic device. The second signal is an audio signal for instructing the electronic device to maintain the wireless communication.

The present invention provides an electronic device for wireless network connection. The electronic device includes a display unit, a signal transceiving unit, a connection unit and an audio transmitting unit. The signal transceiving unit is utilized to transmit a first signal to an additional electronic device. The first signal is utilized to identify the electronic device. The connection unit is utilized to develop a wireless communication between the electronic device and the additional electronic device when the additional electronic device identifies the electronic device through the first signal. The audio transmitting unit is utilized to transmit a second signal to the additional electronic device. The second signal is an audio signal for instructing the additional electronic device to maintain the wireless communication.

The present invention provides an electronic device for wireless network connection. The electronic device includes a display unit, a signal transceiving unit, a control unit, a connection unit and an audio receiving unit. The signal transceiving unit is utilized to receive a first signal from an additional electronic device, and the first signal is utilized to identify the additional electronic device. The control unit is utilized to identify the additional electronic device through the first signal. The connection unit is utilized to develop wireless communication between the electronic device and the additional electronic device when the control unit identifies the additional electronic device. The audio receiving unit is utilized to receive a second signal transmitted by the additional electronic device, the second signal is an audio signal for instructing the electronic device to maintain the wireless communication, and the connection unit maintains the wireless communication when the audio receiving unit receives the second signal.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows. This description is made for the purpose of illustrating the general principles of the invention and should not be taken in a limiting sense. It should be understood that the embodiments may be realized in software, hardware, firmware, or any combination thereof.

Figure 1:
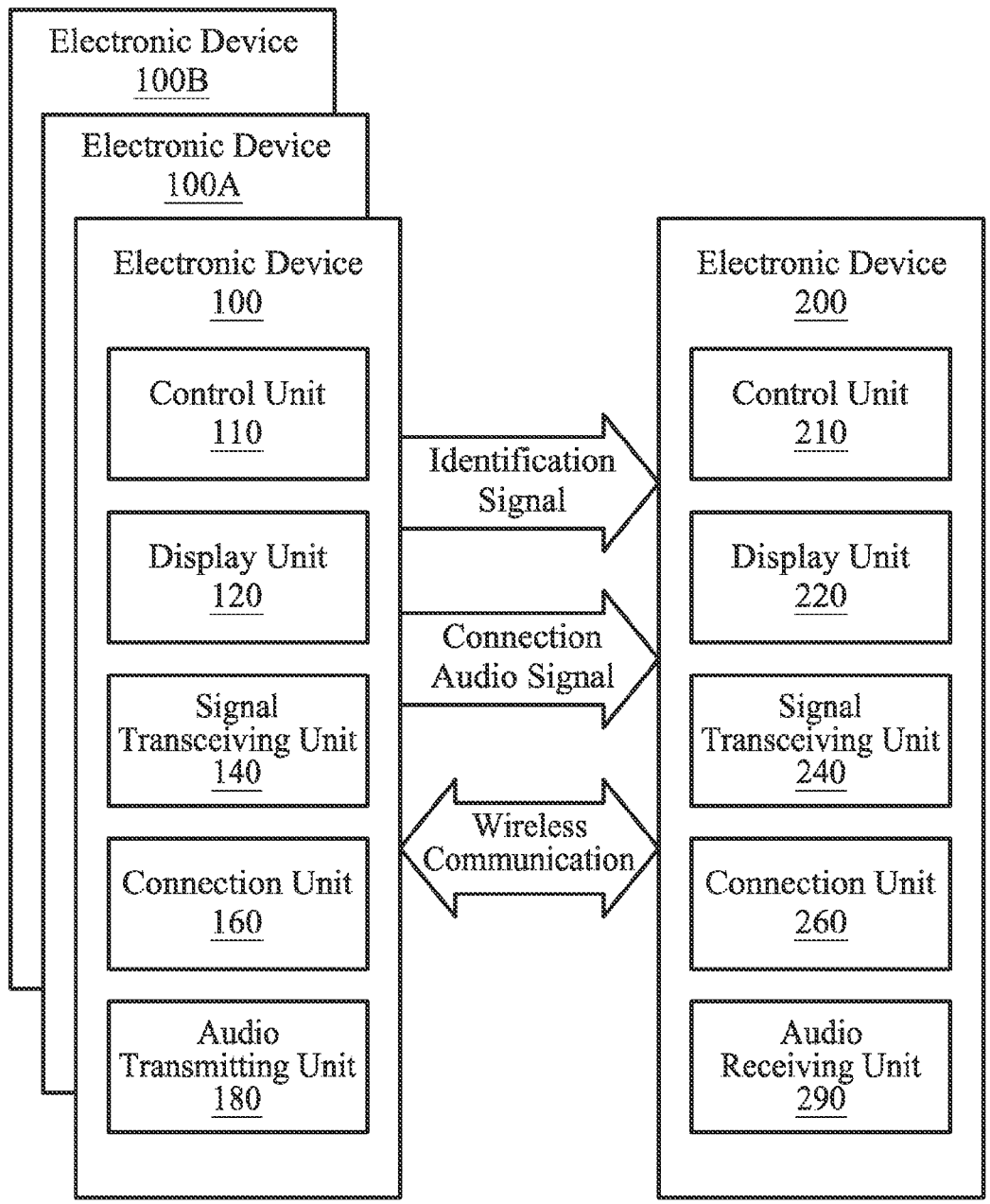
FIG. 1 is a schematic diagram illustrating an electronic device and an external electronic device according to an embodiment of the invention.

FIG. 1 is a schematic diagram illustrating an electronic device 100 and an electronic device 200 of the present invention. Each of the electronic devices 100, 100A and 100B includes a control unit 110, a display unit 120, a signal transceiving unit 140, a connection unit 160 and an audio transmitting unit 180, respectively. The electronic device 200 includes a control unit 210, a display unit 220, a signal transceiving unit 240, a connection unit 260 and an audio receiving unit 290. The electronic devices 100 and 200 could be devices which provide wireless network service and network connection such as a network server, a cell phone, a desktop computer, a laptop computer or a tablet computer, and are not limited thereto. In one embodiment, the electronic device 100 is a smart phone, and the electronic device 200 is a laptop computer or a tablet computer. In the embodiments of the present invention, each unit could be composed of hardware components including a chip, a controller, a storage device and/or other necessary circuits.

For example, the control units 110 and 210 include a digital signal processor (DSP), a microcontroller (MCU), a central-processing unit (CPU) or a plurality of parallel processors relating the parallel processing environment to implement the operating system (OS), firmware, driver and/or other applications of the electronic device. The display units 120 and 220 could be touch display panels such as resistive touch panels, capacitive touch panels, optical touch panels or electromagnetic touch panels. The signal transceiving units 140 and 240 include input/output ports (such as USB ports) and/or cables. In addition, the audio transmitting unit 180 is a speaker for transmitting sound. The audio receiving unit 290 could be a device such as a microphone for receiving sound. The connection units 160 and 260 could be wireless communication chips or their relating entities to develop wireless communication based on a communication protocol according to the present invention. For example, the protocol of wireless communication could constitute GSM, GPRS, EDGE, UMTS, W-CDMA, CDMA2000, TD-CDMA, Bluetooth, NFC, WiFi, WiMAX, LTE, LTE-A or TD-LTE.

In one embodiment, the signal transceiving unit 140 of the electronic device 100 transmits an identification signal (the first signal) to the electronic device 200 such that the electronic device 200 could identify the electronic device 100. For example, when the cable connects to the input/output ports of the electronic devices 100 and 200, the electronic device 100 transmits the identification signal to the electronic device 200 through the cable (the signal transceiving unit 140). In additional embodiment, the electronic device 100 transmits the identification signal through the connection unit 160, and the electronic device 200 also receives the identification signal through the connection unit 260. In additional embodiment, the electronic device 100 transmits the identification signal through the audio transmitting unit 180, and the electronic device 200 also receives the identification signal through the audio receiving unit 290.

When the electronic device 200 receives the identification signal transmitted by the electronic device 100, the control unit 210 of the electronic device 200 analyzes the identification signal to identify the electronic device 100. When the electronic device 200 identifies or successfully confirms the electronic device 100 through the identification signal, the electronic device 200 transmits an identification confirming signal to the electronic device 100 through the signal transceiving unit 240 or the connection unit 260. Afterwards, after the electronic device 100 receives the identification confirming signal, the connection unit 160 of the electronic device 100 tries to develop the wireless communication between the electronic devices 100 and 200. In additional embodiment, when the electronic device 200 successfully confirms the electronic device 100, the connection unit 260 of the electronic device 200 tries to develop the wireless communication between the electronic devices 100 and 200. In other words, the wireless communication between the electronic devices 100 and 200 could be initiated by the electronic device 100 or the electronic device 200 and developed after the confirmation response of the electronic device 100 or the electronic device 200.

After developing the wireless communication between the electronic devices 100 and 200, the audio transmitting unit 180 of the electronic device 100 transmits a connecting audio signal (the second signal) to the electronic device 200. In one embodiment, the identification signal is the same as the connecting audio signal. It should be noted that the connecting audio signal is an audio signal for instructing the electronic device 200 to maintain the wireless communication between the electronic devices 100 and 200. In one embodiment, the frequency of the connecting audio signal is greater than about 18000 Hz. For example, the frequency range of the connecting audio signal is 18000 Hz to 20000 Hz. Ordinary speakers are capable of transmitting sound in the above frequency range, but it cannot be heard by most users. Therefore, when the audio transmitting unit 180 transmits the connecting audio signal of the frequency range, the information could be transmitted efficiently, and the electronic device 200 could be instructed to maintain the wireless communication between the electronic devices 100 and 200 without bothering the users.

Specifically, the second signal transmitted by the audio transmitting unit 180 includes at least one package. The content of the package includes an initiating audio, transmission type, address of the transmitting terminal (MAC address), address of the receiving terminal, package status, data and the ending audio. The above transmitting terminal and receiving terminal could be the electronic device 100 or 200. For example, the above transmission type includes three application modes such as broadcasting the MAC address to all receiving terminals, broadcasting the MAC address to all receiving terminals and receiving acknowledge information, and transmitting the MAC address to specific receiving terminals and receiving acknowledge information. The package status is utilized to indicate that the package is a sub-package of additional large package and indicate the sequence of the sub-package within the large package. In additional embodiment, the audio transmitting unit 180 transmits the connecting audio signal to the electronic device 200, and the wireless communication between the electronic devices 100 and 200 is developed according to the information of addresses of the transmitting and receiving terminals included by the connecting audio signal.

In one embodiment, the electronic device 200 includes an identification data table to record the identification data (ID) of the at least one electronic device 100, 100A and/or 100B.

TABLE 1

|  | Identification Signal | Connecting Audio Signal |
|---|---|---|
| Electronic Device 100 | 00 | $F_0$ |
| Electronic Device 100A | 01 | $F_A$ |
| Electronic Device 100B | 10 | $F_B$ |

As shown in Table 1, the electronic devices 100, 100A and 100B each have their own respective identification signal and connecting audio signal. For example, in the ID table, the value of the identification signal of the electronic device 100 is 00, and the frequency of the connecting audio signal is F0. The value of the identification signal of the electronic device 100A is 01, and the frequency of the connecting audio signal is FA. When the electronic device 200 receives the identification signal transmitted by the electronic device 100, it will check whether the value 00 if the identification signal belongs to the ID table or not. If the identification signal belongs to the ID table, it means that the electronic device 100 has connected to the electronic device 200 before. If the identification signal does not belong to the ID table, it means that the electronic device 100 has never before connected to the electronic device 200, and the electronic device 200 records the value 00 of the identification signal on the ID table. For example, when the electronic device 200 receives additional identification signal, the value of the identification signal can be matched and analyzed. If the value is 00, the electronic device 100 can be identified. If the value is 01, it means that the electronic device 100A connects to the electronic device 200. Because each electronic device 100, 100A and 100B has its own identification value, the judging error could be avoided accordingly.

In addition, electronic devices 100, 100A and 100B have connecting audio signals of frequencies F0, FA and FB, respectively. For example, when the electronic device 100 is close to the electronic device 200, is generates a connecting audio signal at frequency F0 to develop and/or maintain the wireless communication between the electronic devices 100 and 200. When the electronic device 200 receives the connecting audio signal of the frequency F0, it will develop and/or maintain the wireless communication between the electronic devices 100 and 200, and will not develop and/or maintain the wireless communication between the electronic devices 200 and electronic devices other than the electronic device 100. When the electronic device 100 is away from the electronic device 200, the electronic device 200 cannot receive the connecting audio signal of frequency F0, and it will terminate the communication between the electronic devices 100 and 200. By utilizing the connecting audio signals with different frequencies of the above electronic devices, the distance between the electronic devices can be automatically detected by whether at least two electronic devices receive the connecting audio signal or not. The network connection service could be initiated further or terminated accordingly such that the users can transmit or share data more easily.

Figure 2:
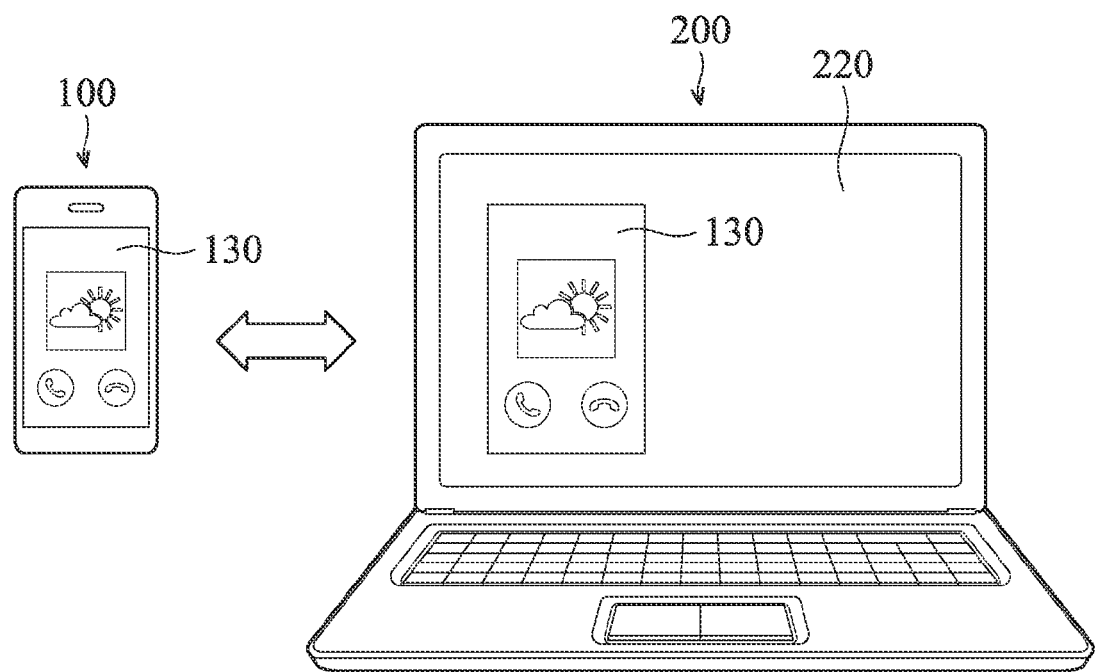
FIG. 2 is a schematic diagram illustrating a synchronizing operation between the electronic device and the external electronic device according to an embodiment of the invention.

FIG. 2 is a schematic diagram illustrating a synchronizing operation between the electronic devices 100 and 200 according to an embodiment of the invention. In one embodiment, after the wireless communication between the electronic devices 100 and 200 is developed, the electronic device 100 displays a screen image 130 of the display unit 120 on the electronic device 200. In other words, as shown in FIG. 2, the display unit 220 of the electronic device 200 synchronously displays the screen image 130 of the electronic device 100. It should be noted that the screen image 130 is utilized to execute the synchronizing operations between the electronic devices 100 and 200.

For example, when a file displayed by the display unit 220 of the electronic device 200 is pulled to the screen image 130 of the display unit 220, the electronic device 200 transmits the file to the electronic device 100. Therefore, the users can transmit data between the electronic devices 100 and 200 more easily. In additional embodiment, the users want to open or edit files stored in the electronic device 100 by the electronic device 200, such as texts in the format of SMS, MMA or HTML, or word files in the format of DOC, TXT, PPT, XLS or PDF, or the video files in the format of AVI, MPEG4, mov, Xvid, 3GP or 3G2. At the same time, when the file on the screen image 130 displayed by the display unit 120 is touched or knocked, then electronic device 200 initiates its application program or software to open, edit or play the file. Therefore, the users can utilize the electronic device 200 to open, edit or play the file which is stored in the electronic device 100.

Figure 3A:
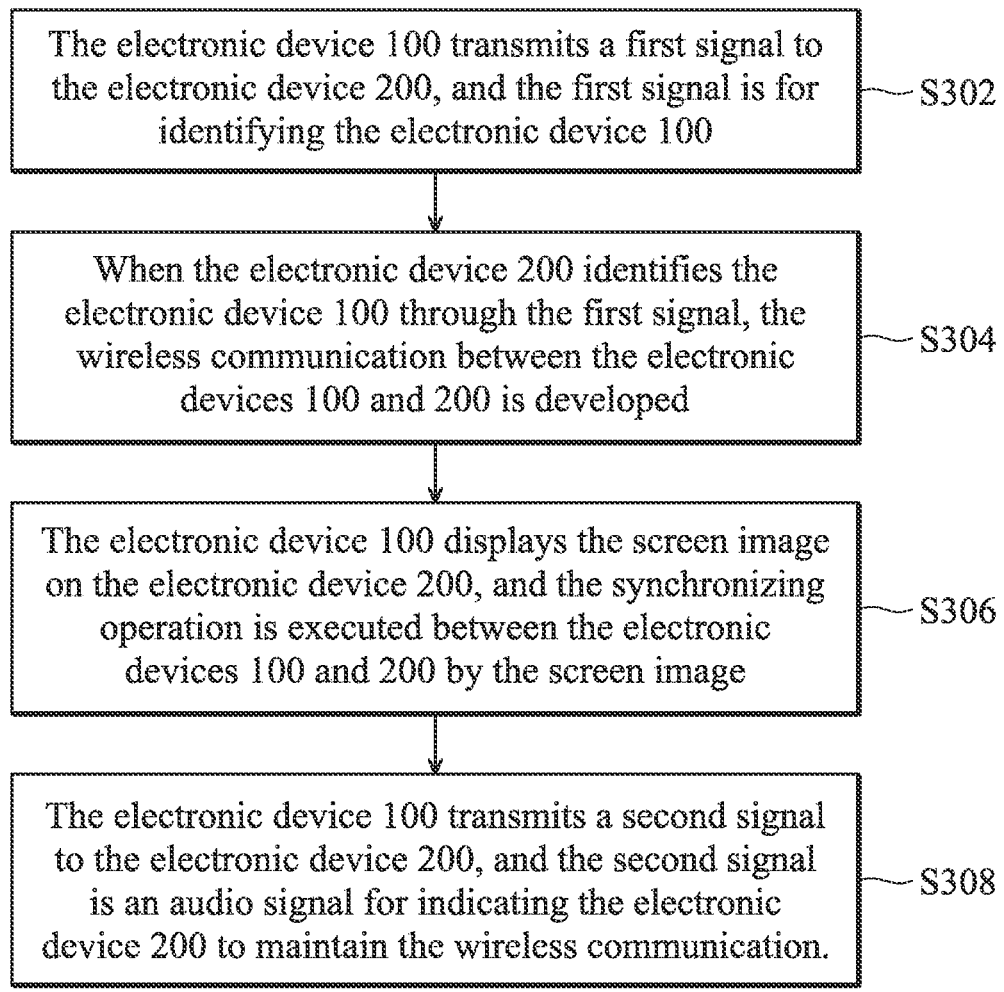
FIG. 3A is a schematic diagram illustrating a wireless network connection method of the electronic device according to an embodiment of the invention.

FIG. 3A is a schematic diagram illustrating a wireless network connection method of the electronic device 100 according to an embodiment of the invention. In step S302, the electronic device 100 transmits a first signal to additional electronic device (such as the electronic device 200), and the first signal is for identifying the electronic device 100. Afterwards, in step S304, when the electronic device 200 identifies the electronic device 100 through the first signal, the wireless communication between the electronic devices 100 and 200 is developed. Afterwards, in step S306, the electronic device 100 transmits the screen image 130 to the electronic device 200 so that the electronic device 200 can display the screen image 130, and the synchronizing operation is executed between the electronic devices 100 and 200 by the screen image. In one embodiment, the electronic device 200 transmits a control command to the electronic device 100, and the electronic device 100 transmits the screen image 130 to the electronic device 200 which is generated according to the control command. In additional embodiment, the screen image 130 can be displayed unsynchronously. Afterwards, in step S308, the electronic device 100 transmits a second signal to the electronic device 200, and the second signal is an audio signal for instructing the electronic device 200 to maintain the wireless communication.

Figure 3B:
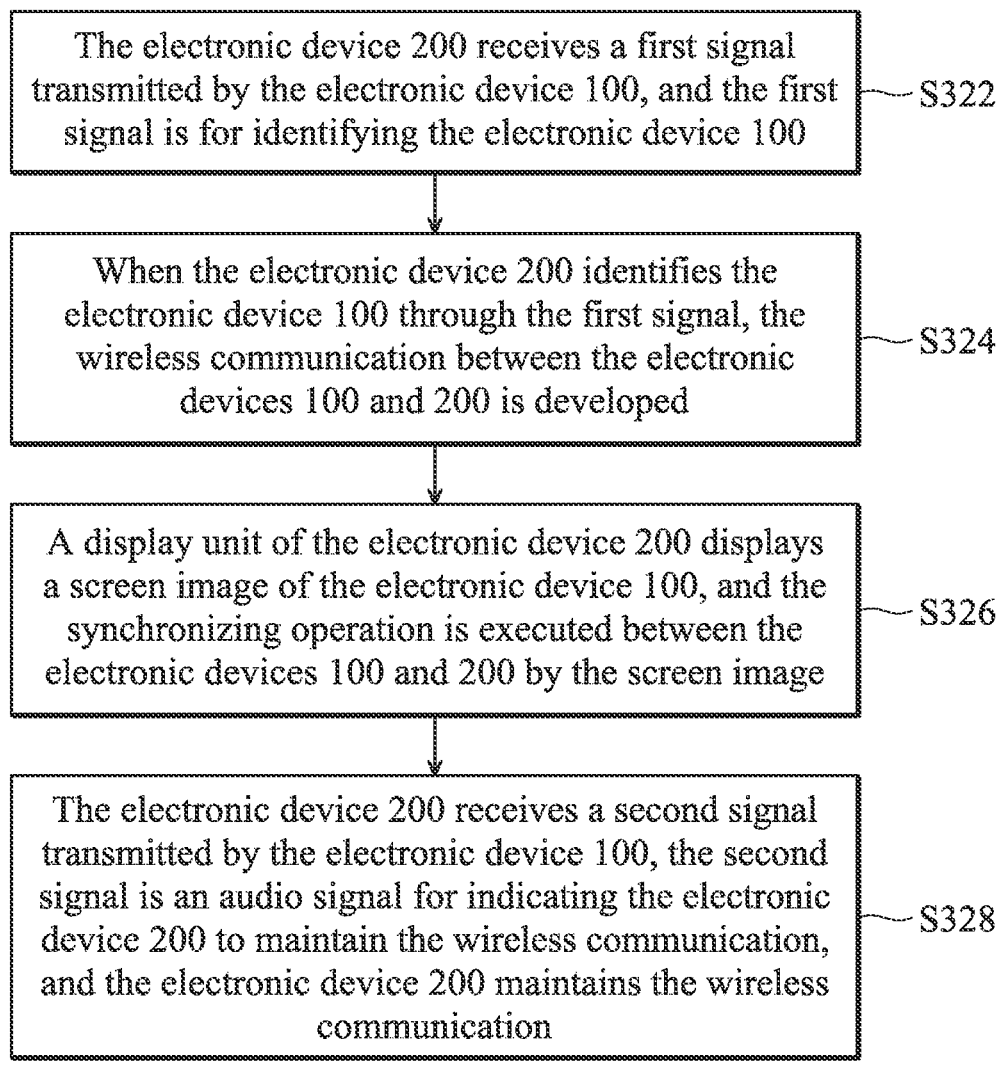
FIG. 3B is additional schematic diagram illustrating a wireless network connection method of the electronic device according to an embodiment of the invention.

FIG. 3B is additional schematic diagram illustrating a wireless network connection method of the electronic device 200 according to an embodiment of the invention. In step S322, the electronic device 200 receives a first signal transmitted by additional electronic device (such as the electronic device 100), and the first signal is for identifying the electronic device 100. Afterwards, in step S324, when the electronic device 200 identifies the electronic device 100 through the first signal, the wireless communication between the electronic devices 100 and 200 is developed by the electronic device 200. Afterwards, in step S326, the display unit 220 of the electronic device 200 displays the screen image 130 of the electronic device 100, and the synchronizing operation is executed between the electronic devices 100 and 200 by the screen image 130. Afterwards, in step S328, the electronic device 200 receives a second signal transmitted by the electronic device 100, the second signal is an audio signal for instructing the electronic device 200 to maintain the wireless communication, and the electronic device 200 maintains the wireless communication.

Figure 4A:
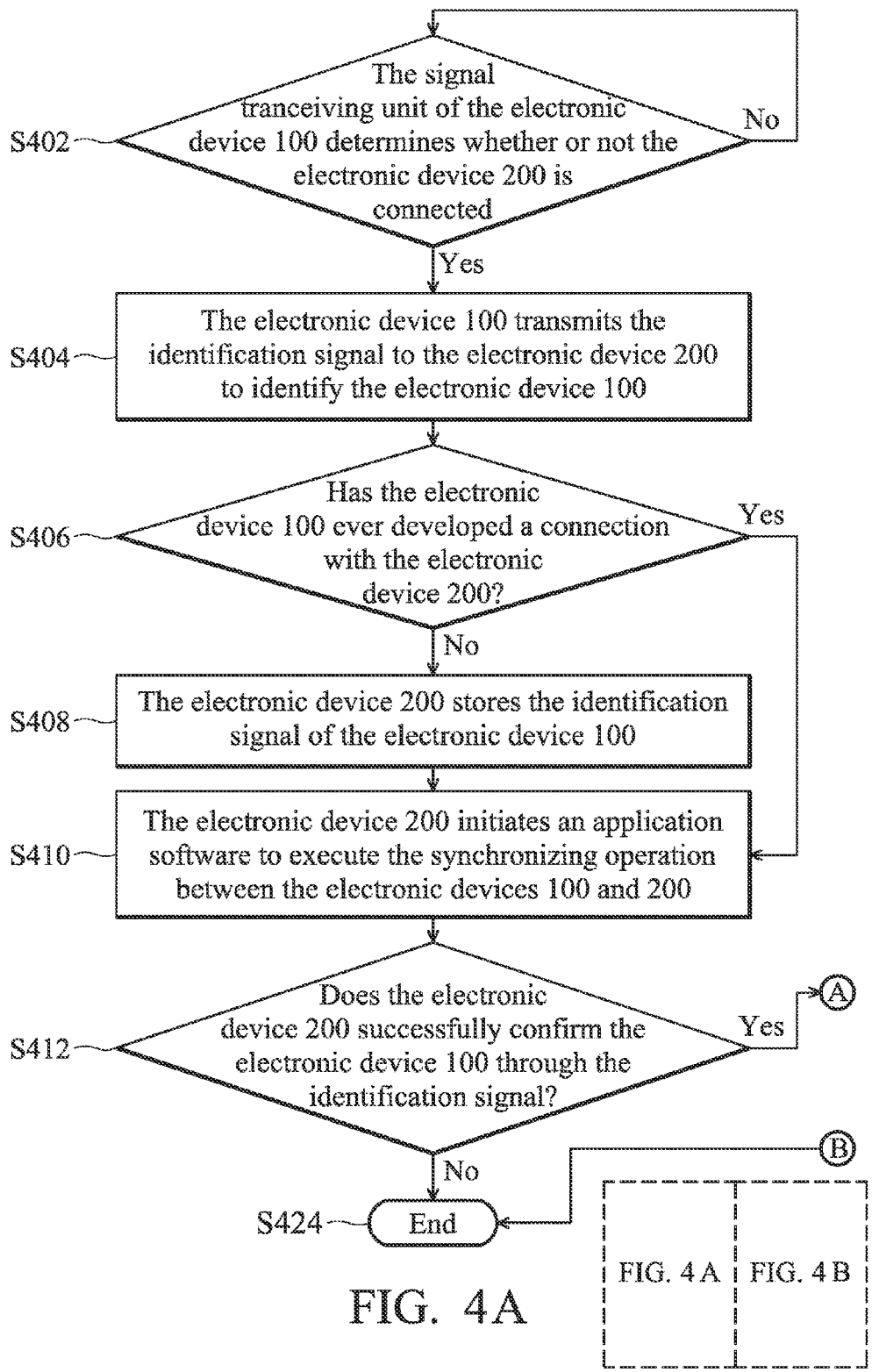
FIG. 4A and FIG. 4B are additional schematic diagram illustrating a wireless network connection method according to an embodiment of the invention.
Figure 4B:
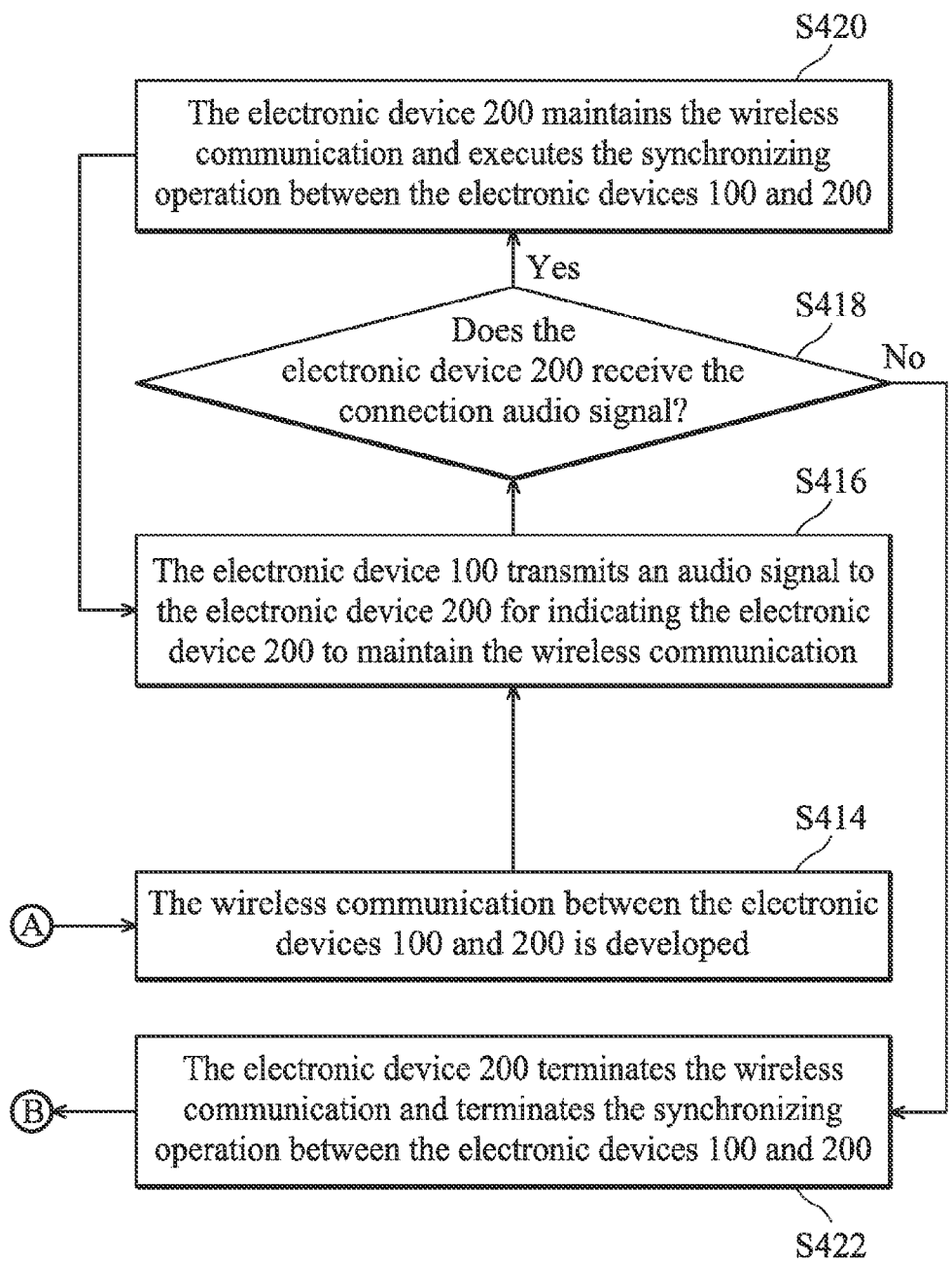

FIG. 4A and FIG. 4B are other schematic diagrams illustrating a wireless network connection method according to an embodiment of the invention. In step S402, the signal transceiving unit 140 of the electronic device 100 determines whether or not additional electronic device (such as the electronic device 200) is connected. If the electronic device 100 does not connect the electronic device 200, step S402 is executed again. If the electronic device 100 connects the electronic device 200, step S404 is executed. In step S404, the electronic device 100 transmits the identification signal to the electronic device 200 to identify the electronic device 100. Afterwards, in step S406, the electronic device 200 determines whether the electronic device 100 has developed a connection with the electronic device 200 or not. If the electronic device 200 determines that the electronic device 100 has ever developed a connection with the electronic device 200, step S410 is executed. If the electronic device 200 determines that the electronic device 100 has not developed a connection with the electronic device 200 before, step S408 is executed. In step S408, the electronic device 200 stores the identification signal of the electronic device 100. Afterwards, in step S410, the electronic device 200 initiates an application software to execute the synchronizing operation between the electronic devices 100 and 200.

Afterwards, in step S412, the electronic device 200 determines whether or not it successfully confirms the electronic device 100 through the identification signal. If the electronic device 200 does not successfully confirm the electronic device 100 through the identification signal, step S424 is executed for finishing the wireless network connection method. If the electronic device 200 successfully confirms the electronic device 100 through the identification signal, step S414 is executed so that the wireless communication between the electronic devices 100 and 200 is developed by the electronic device 100 and/or the electronic device 200. Afterwards, in step S416, the electronic device 100 transmits a connecting audio signal which is an audio signal to the electronic device 200 for instructing the electronic device 200 to maintain the wireless communication. In step S418, the electronic device 200 determines whether it receives the connection audio signal or not. If the electronic device 200 receives the connection audio signal, step S420 is executed. If the electronic device 200 does not receive the connection audio signal, step S422 is executed. In step S420, the electronic device 200 maintains the wireless communication and executes the synchronizing operation between the electronic devices 100 and 200. Afterwards, step S416 is executed so that the electronic device 100 transmits the audio signal to the electronic device 200. In step S422, the electronic device 200 terminates the wireless communication and terminates the synchronizing operation between the electronic devices 100 and 200. Afterwards, step S424 is executed for finishing the wireless network connection method. The detailed steps of the content of the connecting audio signal and executing synchronizing operations have been illustrated before and will not be repeated.

The present invention provides a wireless network connection method for a plurality of electronic devices to transmit and receive audio signals by transmitting sound within the frequencies of 18000 Hz to 20000 Hz. The electronic devices could determine the distances between them by the audio signals and further initiate or terminate network connection services. The users can transmit data more easily or execute synchronizing operations among different electronic devices. Therefore, the wireless network connection method of the present invention solves the trouble of initiating or terminating network connection service by the users so that the users can develop wireless communication and share data more easily.

Use of ordinal terms such as "first", "second", "third", etc., in the claims to modify a claim element does not by itself connote any priority, precedence, or order of one claim element over additional or the temporal order in which acts of a method are performed, but are used merely as labels to distinguish one claim element having a certain name from additional element having the same name (but for use of the ordinal term) to distinguish the claim elements. While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless network connection method for an electronic device, comprising:
    transmitting a first signal to an additional electronic device, wherein the first signal is utilized to identify the electronic device;
    when the additional electronic device identifies the electronic device through the first signal, developing a wireless communication between the electronic device and the additional electronic device for transmitting data; and
    transmitting a second signal to the additional electronic device, wherein the second signal is an audio signal for instructing the additional electronic device to maintain the wireless communication for transmitting data, and the first signal is the same as the second signal, and the second signal comprises at least one package, and the package comprises an initiating audio, transmission type, address of the transmitting terminal (MAC address), address of the receiving terminal, package status, data and the ending audio.

2. The wireless network connection method as claimed in claim 1, wherein a frequency of the second signal is greater than 18000 Hz.

3. The wireless network connection method as claimed in claim 1, further comprising after the step of developing the wireless communication between the electronic device and the additional electronic device, displaying a screen image of the electronic device on the additional electronic device.

4. The wireless network connection method as claimed in claim 3, further comprising executing synchronizing operations between the electronic device and the additional electronic device through the screen image.

5. An electronic device for wireless network connection, comprising:
    a display unit;
    a signal transceiving unit, utilized to transmit a first signal to an additional electronic device, wherein the first signal is utilized to identify the electronic device;
    a connection unit, utilized to develop a wireless communication between the electronic device and the additional electronic device for transmitting data when the additional electronic device identifies the electronic device through the first signal; and
    an audio transmitting unit, utilized to transmit a second signal to the additional electronic device, wherein the second signal is an audio signal for instructing the additional electronic device to maintain the wireless communication for transmitting data, and the first signal is the same as the second signal, and the second signal comprises at least one package, and the package comprises an initiating audio, transmission type, address of the transmitting terminal (MAC address), address of the receiving terminal, package status, data and the ending audio.

6. The electronic device as claimed in claim 5, wherein after the electronic device develops the wireless communication between the electronic device and the additional electronic device, it displays a screen image played by the display unit on the additional electronic device.

7. The electronic device as claimed in claim 6, wherein the electronic device executes synchronizing operations between the electronic device and the additional electronic device through the screen image.

8. The wireless network connection method as claimed in claim 1, wherein when the additional electronic device fails to receive the second signal, the wireless communication would be terminated.

9. The electronic device as claimed in claim 5, wherein when the additional electronic device fails to receive the second signal, the wireless communication would be terminated.

* * * * *